(12) United States Patent
Chang

(10) Patent No.: US 6,973,853 B2
(45) Date of Patent: Dec. 13, 2005

(54) INFINITELY VARIABLE ANGLE ADJUSTING DEVICE FOR A HANDLEBAR OF A MOTORIZED VEHICLE

(75) Inventor: Feng-Chu Chang, Hsin Chang (TW)

(73) Assignee: Chienti Enterprise Co., Ltd., Taipei Hsien (TW)

( * ) Notice: Subject to any disclaimer, the term of this patent is extended or adjusted under 35 U.S.C. 154(b) by 129 days.

(21) Appl. No.: 10/766,452

(22) Filed: Jan. 27, 2004

(65) Prior Publication Data
US 2005/0160873 A1 Jul. 28, 2005

(51) Int. Cl.[7] .......................... B62K 21/16; B62K 1/00
(52) U.S. Cl. .................. 74/551.3; 74/551.1; 280/278; 280/287
(58) Field of Search .............................. 74/551.1, 551.2, 74/551.3, 551.7; 280/279, 276, 287, 278, 280/775

(56) References Cited

U.S. PATENT DOCUMENTS

| 4,390,300 | A | * | 6/1983 | Foster | 403/24 |
| 4,688,817 | A | * | 8/1987 | Marier | 280/278 |
| 5,678,457 | A | * | 10/1997 | Hals | 74/551.3 |
| 5,887,490 | A | * | 3/1999 | Dittmar | 74/551.3 |
| 6,467,787 | B1 | * | 10/2002 | Marsh | 280/279 |
| 6,776,429 | B2 | * | 8/2004 | Chou | 280/279 |

FOREIGN PATENT DOCUMENTS

EP 000424918 A1 * 5/1991 ................ 74/551.3

* cited by examiner

*Primary Examiner*—Vinh T. Luong
(74) *Attorney, Agent, or Firm*—Alan D. Kamrath; Nikolai & Merserau, P.A.

(57) ABSTRACT

An infinitely variable angle adjusting device for a handlebar of a motorized vehicle includes a fixing seat, a handlebar stem, a pull handle, an adjusting base, a cover, two sockets, two slides, a compression spring, two urging ball units, a shaft, two press members, and a pull wire. Thus, the adjusting base is movable on the shaft freely, so that the handlebar stem is pivoted relative to the fixing seat, so as to adjust the included angle between the handlebar stem and the fixing seat arbitrarily, so that the inclined angle of the handlebar on the handlebar stem can be adjusted easily and arbitrarily.

16 Claims, 11 Drawing Sheets

INFINITELY VARIABLE ANGLE ADJUSTING DEVICE FOR A HANDLEBAR OF A MOTORIZED VEHICLE

BACKGROUND OF THE INVENTION

1. Field of the Invention

The present invention relates to an angle adjusting device, and more particularly to an infinitely variable angle adjusting device for a handlebar of a motorized vehicle, such as a motorized cycle or bicycle or the like.

2. Description of the Related Art

A conventional angle adjusting device for a handlebar of a motorized vehicle in accordance with the prior art shown in FIG. 11 comprises a fixing seat B having a connecting portion B1 formed with a plurality of holes B2, and a handlebar stem A pivotally mounted on the fixing seat B and having an adjusting member A1 having a retractable pin A3 adjustably mounted in one of the holes B2 of the connecting portion B1 of the fixing seat B. The adjusting member A1 of the handlebar stem A has a driving plate A2 connected to a pull wire C which is connected to a pull lever D. Thus, the pull lever D is pulled to move the pull wire C which moves the driving plate A2 which moves the retractable pin A3 of the adjusting member A1 to be adjustably mounted in one of the holes B2 of the connecting portion B1 of the fixing seat B so as to adjust the included angle between the handlebar stem A and the fixing seat B, so that the inclined angle of a handlebar E mounted on the handlebar stem A can be adjusted.

However, the included angle between the handlebar stem A and the fixing seat B arbitrarily cannot be adjusted arbitrarily, thereby limiting the function of the conventional angle adjusting device.

SUMMARY OF THE INVENTION

The primary objective of the present invention is to provide an infinitely variable angle adjusting device for a handlebar of a motorized vehicle, such as a motorized cycle or bicycle or the like.

Another objective of the present invention is to provide an angle adjusting device, wherein the adjusting base is movable on the shaft freely, so that the handlebar stem is pivoted relative to the fixing seat, so as to adjust the included angle between the handlebar stem and the fixing seat arbitrarily, so that the inclined angle of the handlebar mounted on the handlebar stem can be adjusted easily and arbitrarily.

In accordance with the present invention, there is provided an angle adjusting device, comprising:

a fixing seat having a first end formed with an upright rod and a second end having a first side formed with an elbow and a second side formed with a pivot arm;

a handlebar stem pivotally mounted on the fixing seat and having a first end pivotally mounted on the elbow of the fixing seat;

a pull handle pivotally mounted on the handlebar stem;

an adjusting base pivotally mounted on the handlebar stem and having an inside formed with a chamber having two ends each formed with an opening;

two sockets each mounted in the chamber of the adjusting base and has an inner wall having an end formed with a tapered face located adjacent to and directed toward the respective opening of the chamber of the adjusting base;

two slides each movably mounted in the sockets and located adjacent to the tapered face of a respective one of the sockets;

a compression spring mounted in the sockets and urged between the two slides;

two urging ball units each movably mounted in the sockets and urged between the compression spring and a respective one of the two slides;

a shaft pivotally mounted on the fixing seat, extended through the sockets, the compression spring and the slides, and fixed in the sockets by the urging ball units; and two press members each pivotally mounted on the adjusting base and each having a side formed with a pressing portion rested on a respective one of the two slides.

Further benefits and advantages of the present invention will become apparent after a careful reading of the detailed description with appropriate reference to the accompanying drawings.

DETAILED DESCRIPTION OF THE INVENTION

Figure 1:
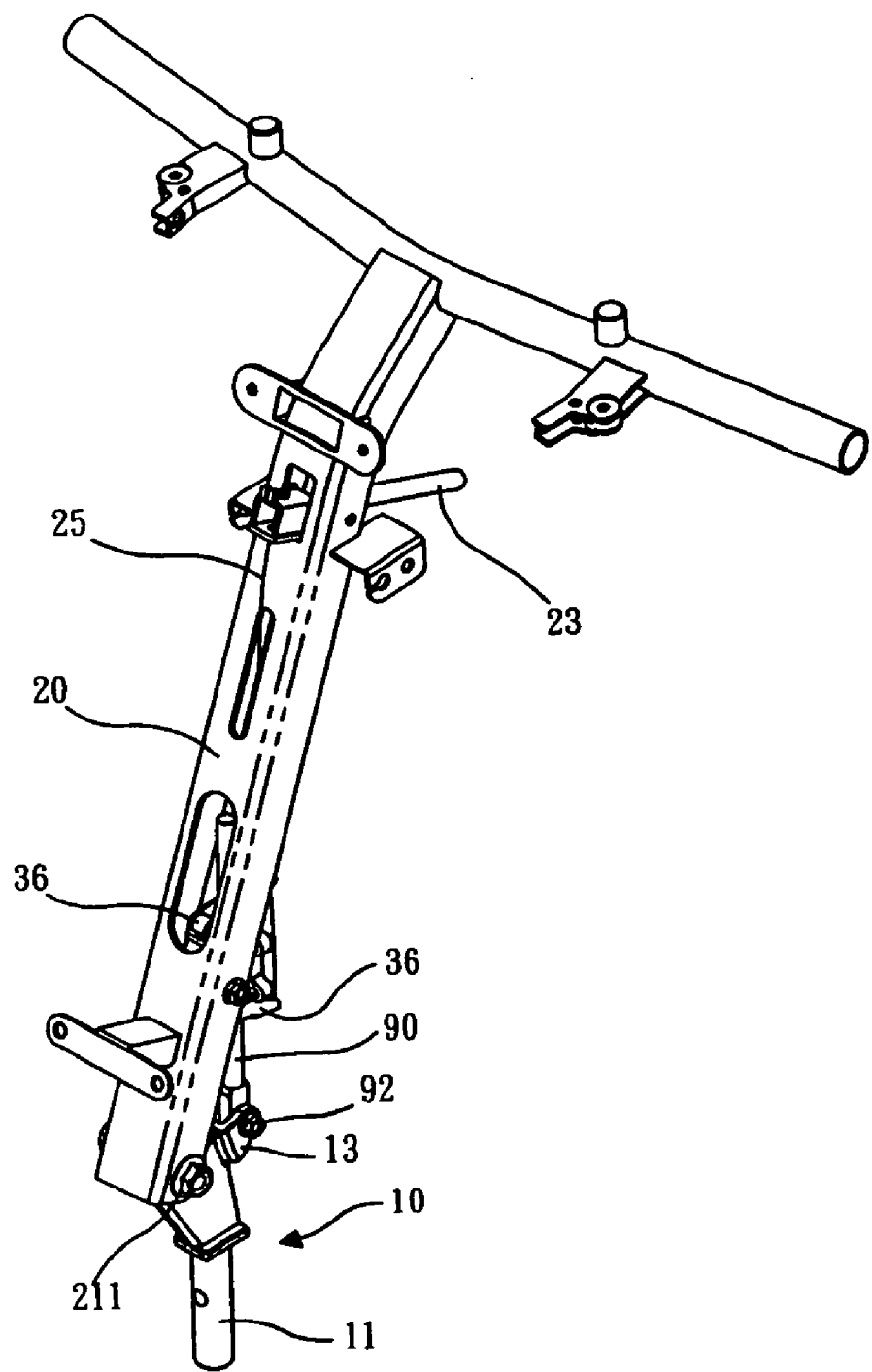
FIG. 1 is a perspective view of an angle adjusting device in accordance with the preferred embodiment of the present invention.
Figure 2:
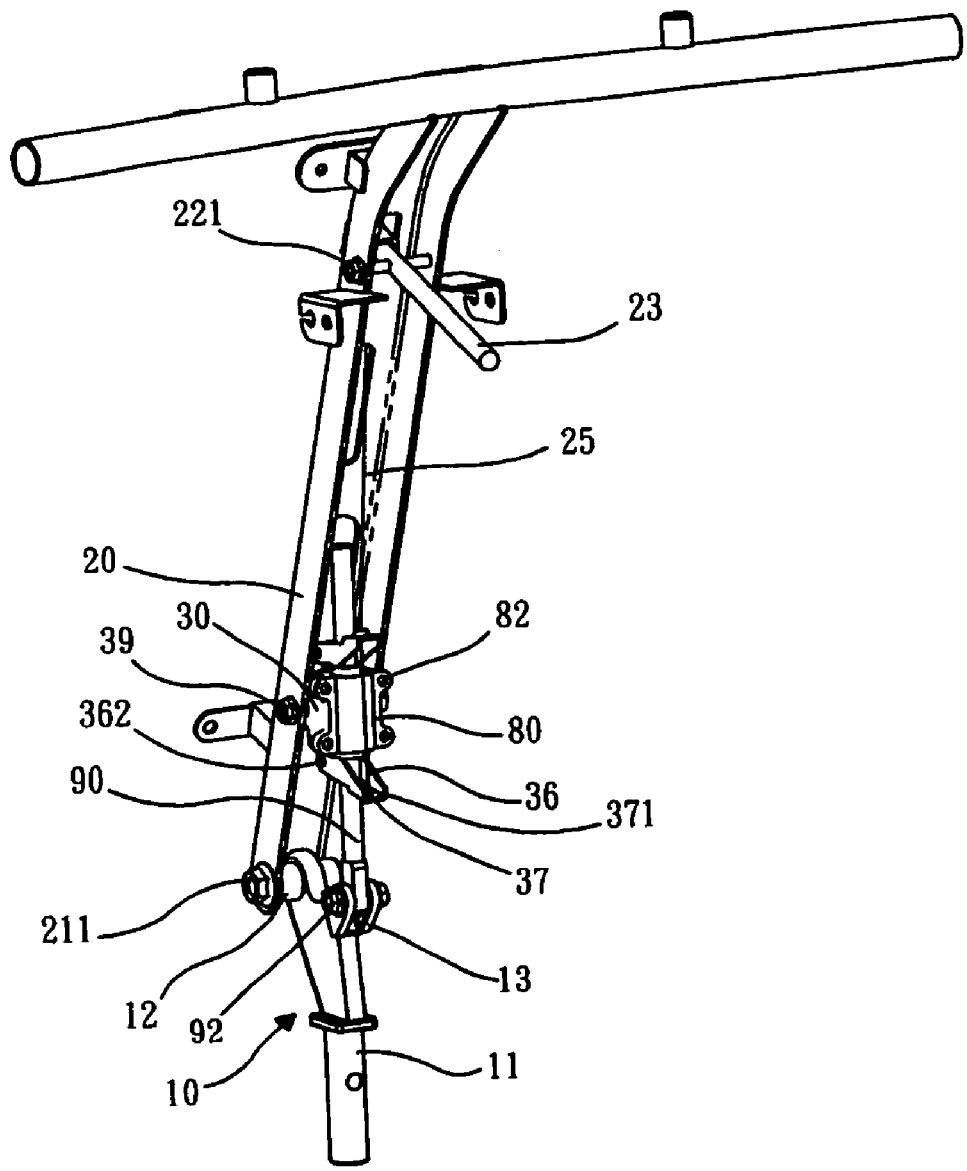
FIG. 2 is a perspective view of the angle adjusting device in accordance with the preferred embodiment of the present invention.
Figure 3:
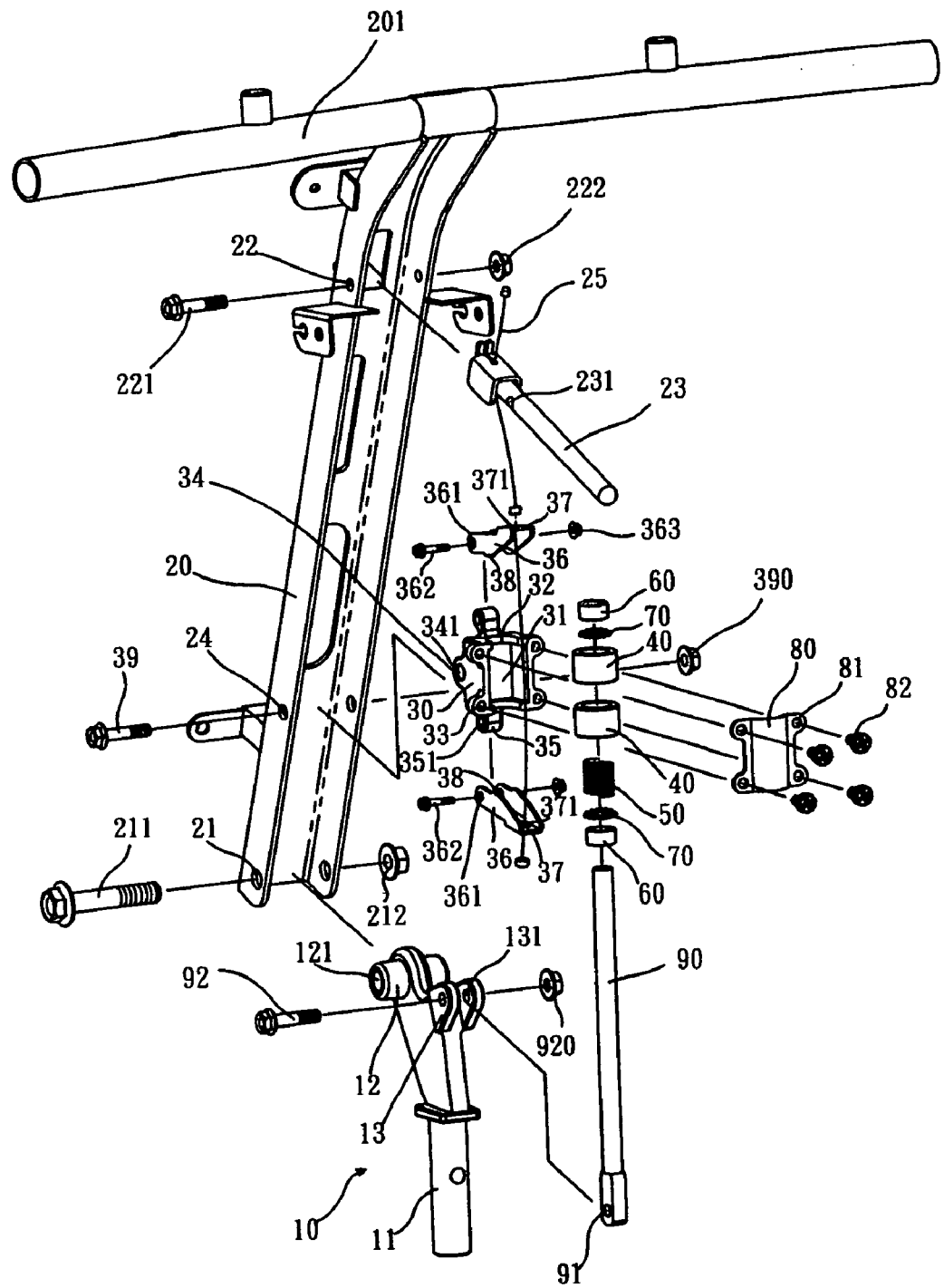
FIG. 3 is an exploded perspective view of the angle adjusting device as shown in FIG. 2.
Figure 4:
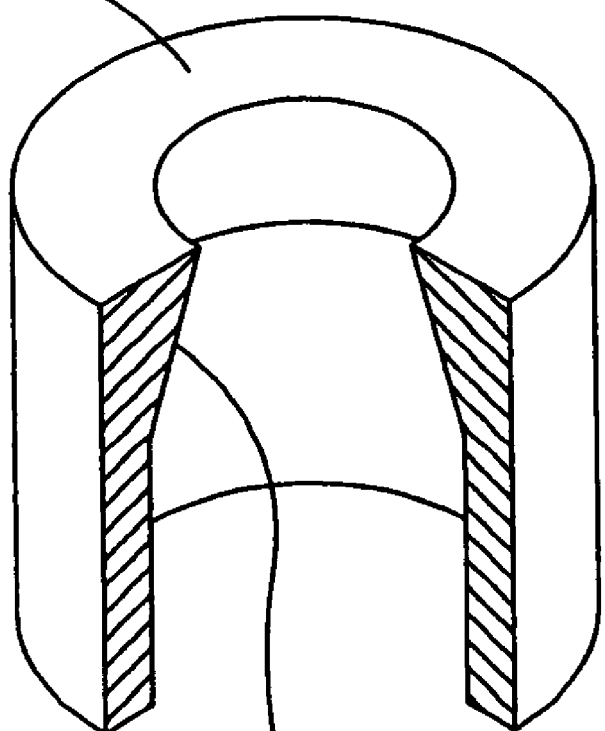
FIG. 4 is a partially cut-away cross-sectional view of a socket of the angle adjusting device as shown in FIG. 3.

Referring to the drawings and initially to FIGS. 1–6, an angle adjusting device for a handlebar of a motorized vehicle in accordance with the preferred embodiment of the present invention comprises a fixing seat 10, a handlebar stem 20, a pull handle 23, an adjusting base 30, a cover 80, two sockets 40, two slides 60, a compression spring 50, two urging ball units 70, a shaft 90, two press members 36, and a pull wire 25.

The fixing seat 10 is substantially Y-shaped and has a first end formed with an upright rod 11 mounted on a head tube (not shown) of the motorized vehicle and a second end having a first side formed with an elbow 12 formed with a pivot hole 121 and a second side formed with a substantially U-shaped pivot arm 13 formed with a pivot hole 131.

The handlebar stem 20 is pivotally mounted on the fixing seat 10 and has a first end pivotally mounted on the elbow 12 of the fixing seat 10 and formed with a first through hole 21 aligning with the pivot hole 121 of the elbow 12, a mediate portion formed with a second through hole 24 and a second end formed with a third through hole 22. The angle adjusting device further comprises a bolt 211 extended through the first through hole 21 of the handlebar stem 20 and the pivot hole 121 of the elbow 12, and a nut 212 screwed onto the bolt 211. A handlebar 201 is mounted on the second end of the handlebar stem 20.

The pull handle 23 is pivotally mounted on the handlebar stem 20 and is formed with a pivot hole 231 aligning with the third through hole 22 of the handlebar stem 20, and the angle adjusting device further comprises a bolt 211 extended through the third through hole 22 of the handlebar stem 20 and the pivot hole 231 of the pull handle 23, and a nut 222 screwed onto the bolt 221.

The adjusting base 30 is pivotally mounted on the handlebar stem 20 and has a first side formed with an elbow 34 formed with a pivot hole 341 aligning with the second through hole 24 of the handlebar stem 20, and the angle adjusting device further comprises a bolt 39 extended through the second through hole 24 of the handlebar stem 20 and the pivot hole 341 of the elbow 34 of the adjusting base 30, and a nut 390 screwed onto the bolt 39. The first side of the adjusting base 30 has two ends each formed with a protruding pivot ear 35 formed with a pivot hole 351. The adjusting base 30 has an inside formed with a chamber 31 having two ends each formed with an opening 32. The adjusting base 30 has an opened second side formed with four threaded locking holes 33.

The cover 80 is mounted on the second side of the adjusting base 30 and is formed with four through holes 81 aligning with the locking holes 33 of the adjusting base 30, and the angle adjusting device further comprises a plurality of screws 82 each extended through a respective one of the through holes 81 of the cover 80 and each screwed into a respective one of the locking holes 33 of the adjusting base 30.

Each of the two sockets 40 is mounted in the chamber 31 of the adjusting base 30 and has an inner wall having an end formed with a tapered face 41 (see FIG. 4) located adjacent to and directed toward the respective opening 32 of the chamber 31 of the adjusting base 30. In addition, the two sockets 40 are juxtaposed to each other in the chamber 31 of the adjusting base 30.

Each of the two slides 60 is a hollow body. Each of the two slides 60 is movably mounted in the sockets 40 and is located adjacent to the tapered face 41 of a respective one of the sockets 40.

The compression spring 50 is mounted in the sockets 40 and is urged between the two slides 60.

Each of the urging ball units 70 is movably mounted in the sockets 40 and is urged between the compression spring 50 and a respective one of the two slides 60.

The shaft 90 is pivotally mounted on the fixing seat 10 and extended through the sockets 40, the compression spring 50 and the slides 60 and is fixed in the sockets 40 by the urging ball units 70.

In such a manner, each of the urging ball units 70 is movable in the sockets 40 between a first position where each of the urging ball units 70 is urged by the tapered face 41 of a respective one of the sockets 40 to lock the shaft 90, so that the shaft 90 is fixed in the sockets 40 by the urging ball units 70, and the adjusting base 30 is fixed on the shaft 90, and a second position where each of the urging ball units 70 is detached from the tapered face 41 of a respective one of the sockets 40 to release the shaft 90, so that the shaft 90 is movable in the sockets 40 by detaching the urging ball units 70, and the adjusting base 30 is movable on the shaft 90.

The shaft 90 has a distal end pivotally mounted on the pivot arm 13 of the fixing seat 10 and formed with a pivot hole 91 aligning with the pivot hole 131 of the pivot arm 13, and the angle adjusting device further comprises a bolt 92 extended through the pivot hole 131 of the pivot arm 13 and the pivot hole 91 of the shaft 90, and a nut 920 screwed onto the bolt 92.

Each of the two press members 36 is pivotally mounted on the adjusting base 30 and has a first end formed with a pivot hole 361 aligning with the pivot hole 351 of the respective pivot ear 35 of the adjusting base 30, and the angle adjusting device further comprises two bolts 362 each extended through the pivot hole 361 of a respective one of the press members 36 and the pivot hole 351 of the respective pivot ear 35 of the adjusting base 30, and two nuts 363 each screwed onto the respective bolt 362. Each of the two press members 36 has a flattened second end 37 formed with a through hole 371. Each of the two press members 36 has a side formed with an arc-shaped pressing portion 38 rested on a respective one of the two slides 60.

The pull wire 25 is extended through the through hole 371 of the flattened second end 37 of each of the two press members 36 and has a first end secured on the flattened second end 37 of one of the two press members 36 and a second end secured on an end of the pull handle 23, so that each of the two press members 36 is pivoted on the adjusting base 30 by pivot of the pull handle 23.

In practice, the fixing seat 10, the handlebar stem 20, the adjusting base 30 and the shaft 90 form a four-link mechanism, wherein the fixing seat 10 functions as a fixing member, the handlebar stem 20 functions as a swinging member, the adjusting base 30 functions as a sliding member, and the shaft 90 functions as a floating member.

Figure 5:
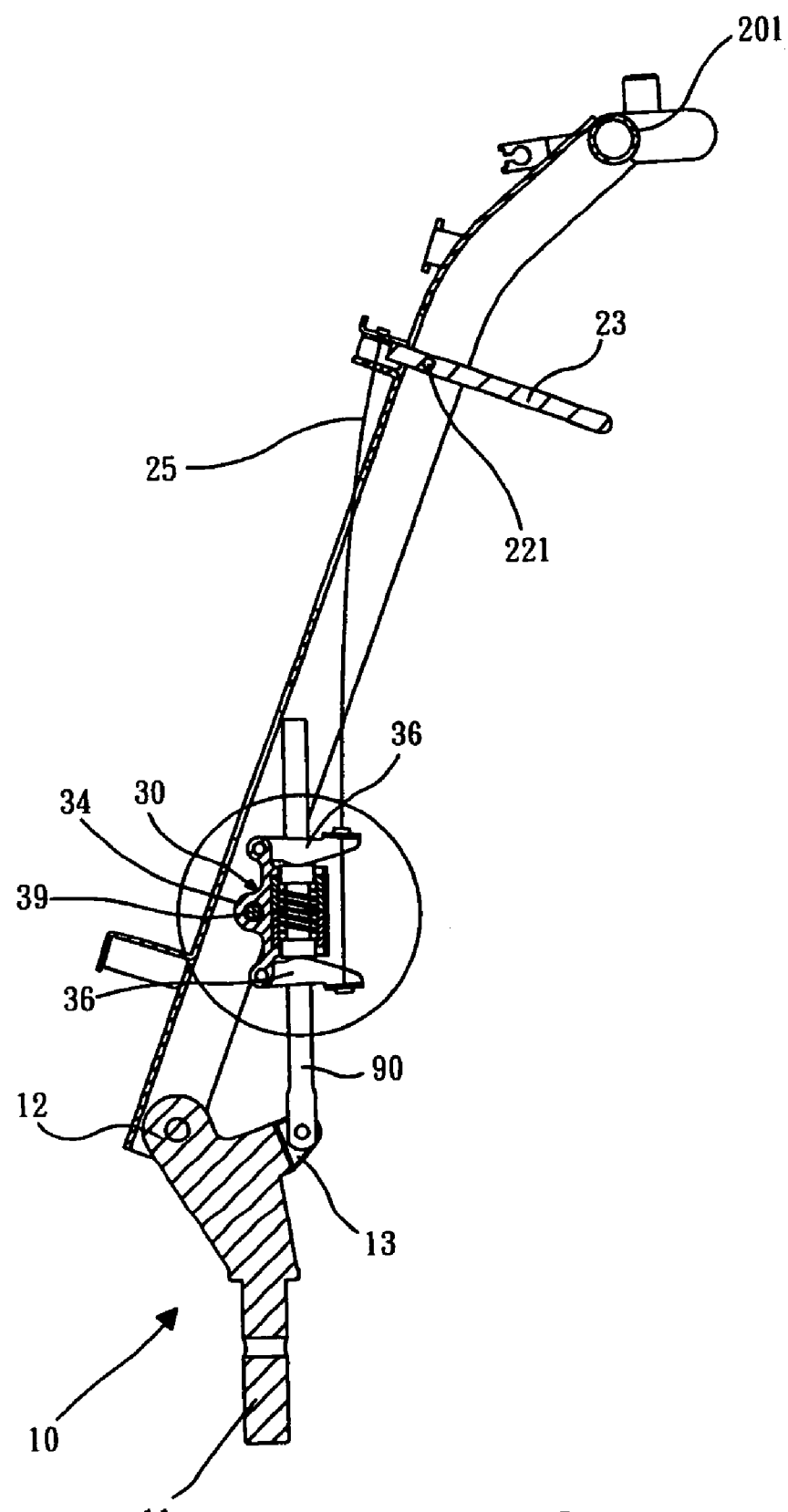
FIG. 5 is a side plan partially cross-sectional view of the angle adjusting device as shown in FIG. 2.
Figure 6:
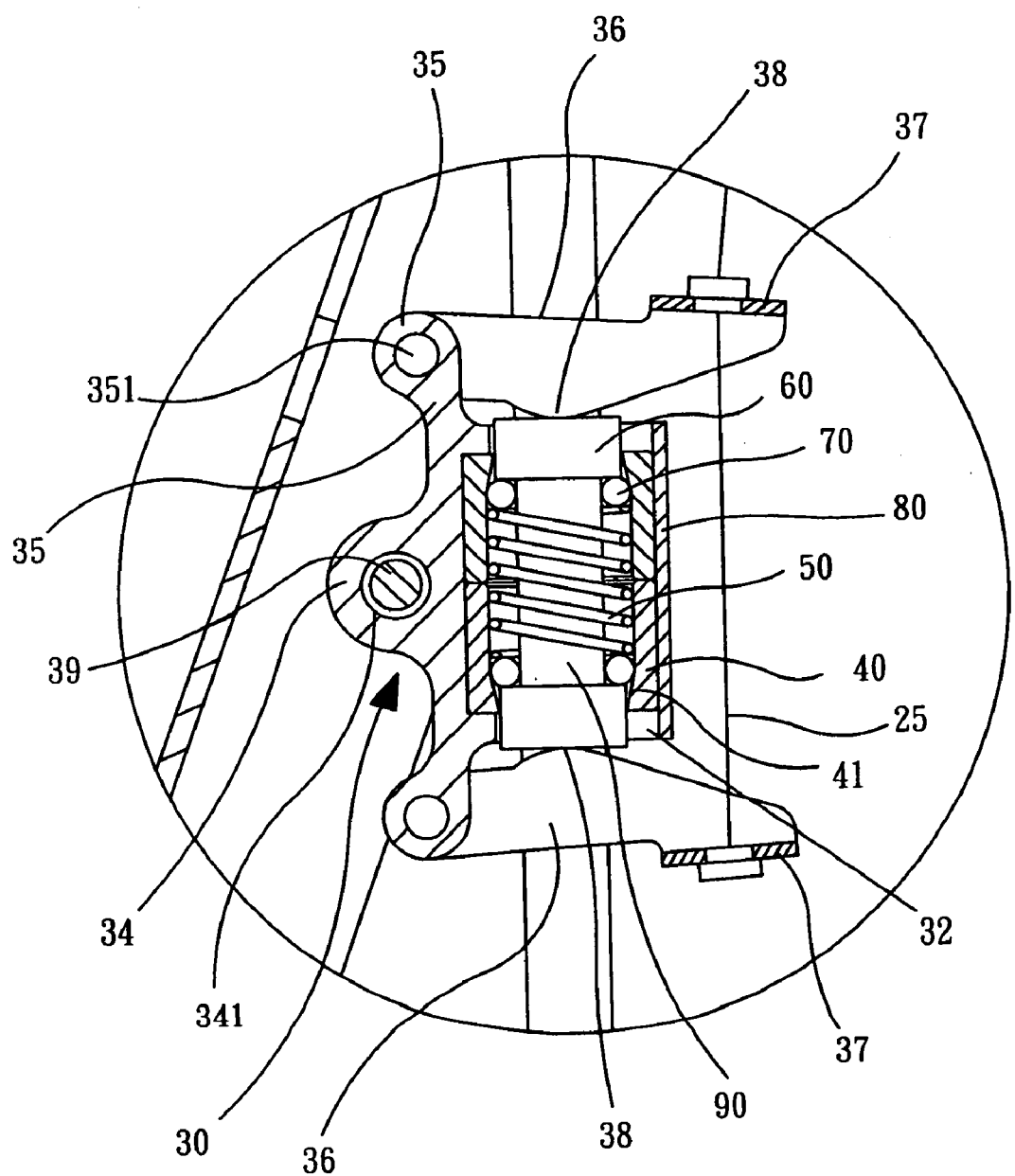
FIG. 6 is a partially enlarged view of the angle adjusting device as shown in FIG. 5.

In operation, referring to FIGS. 5–10 with reference to FIGS. 1–4, each of the urging ball units 70 is pushed by the elastic force of the compression spring 50 to move in the sockets 40 to the first position as shown in FIGS. 5 and 6 where each of the urging ball units 70 is urged by the tapered face 41 of a respective one of the sockets 40 to lock the shaft 90, so that the shaft 90 is fixed in the sockets 40 by the urging ball units 70, and the adjusting base 30 is fixed on the shaft 90.

Figure 7:
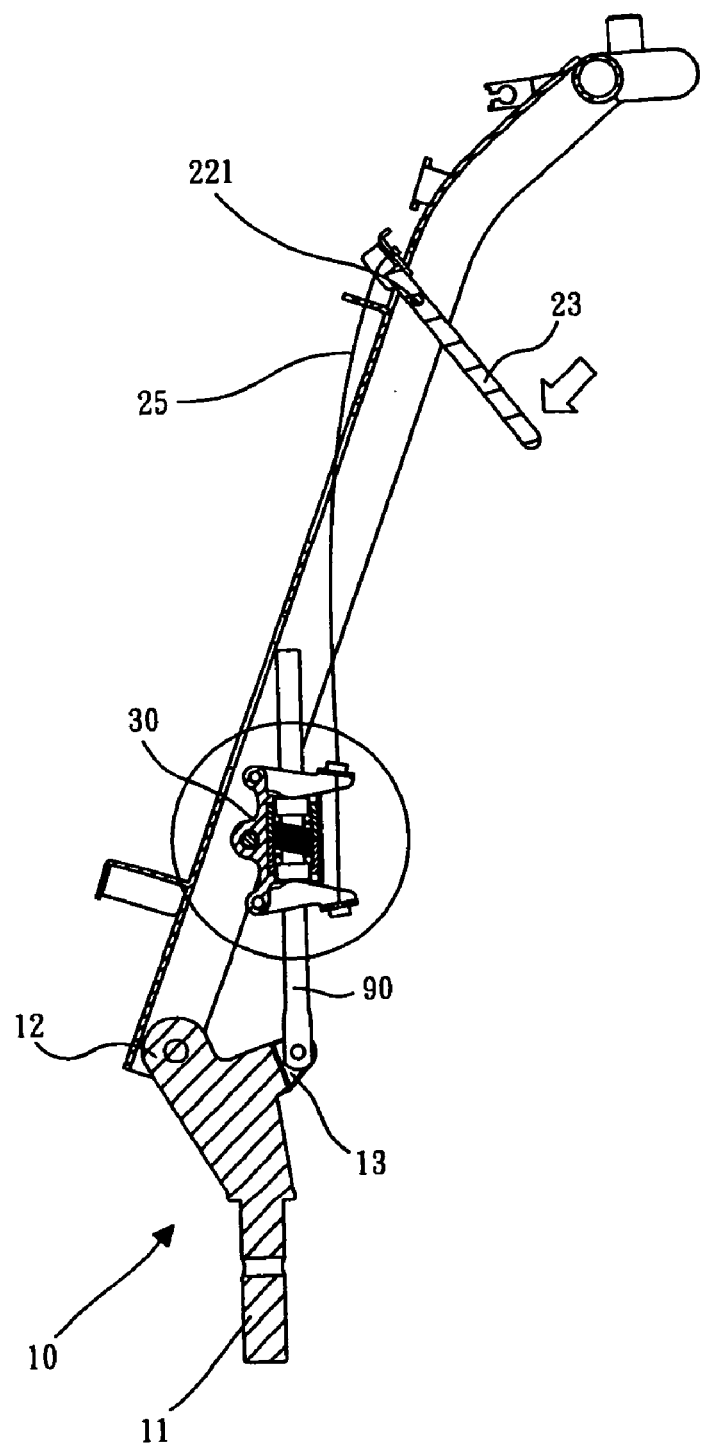
FIG. 7 is a schematic operational view of the angle adjusting device as shown in FIG. 5.
Figure 8:
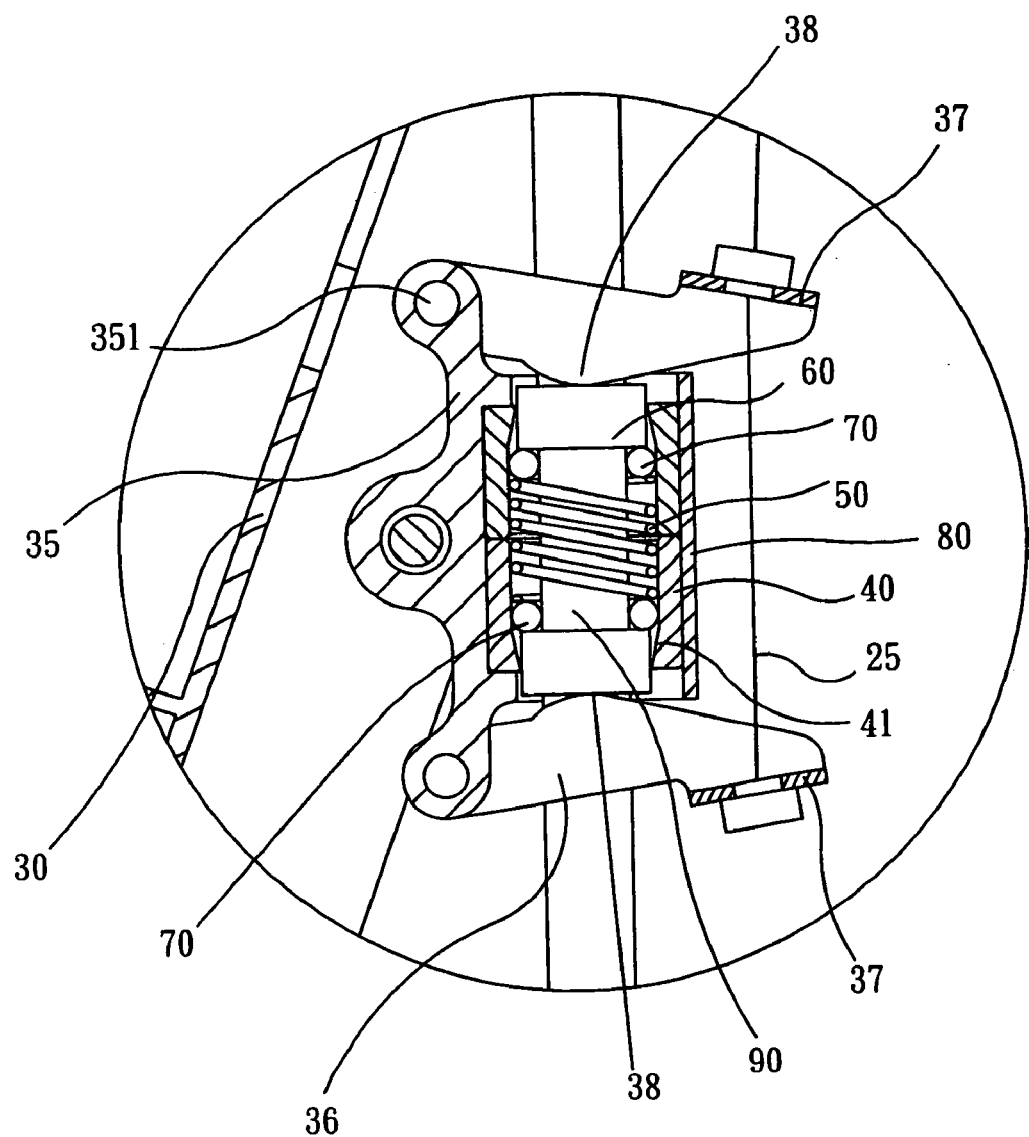
FIG. 8 is a schematic operational view of the angle adjusting device as shown in FIG. 6.

When the pull handle 23 is pivoted downward as shown in FIG. 7, the pull wire 25 is pulled by the pull handle 23, so that each of the two press members 36 is pivoted on the adjusting base 30 by pivot of the pull handle 23 to move the pressing portion 38 to press each of the two slides 60 as shown in FIG. 8, to press and move each of the urging ball units 70 to detach from the tapered face 41 of a respective one of the sockets 40 so as to release the shaft 90, so that the shaft 90 is movable in the sockets 40 by detaching the urging ball units 70, and the adjusting base 30 is movable on the shaft 90 freely.

Figure 9:
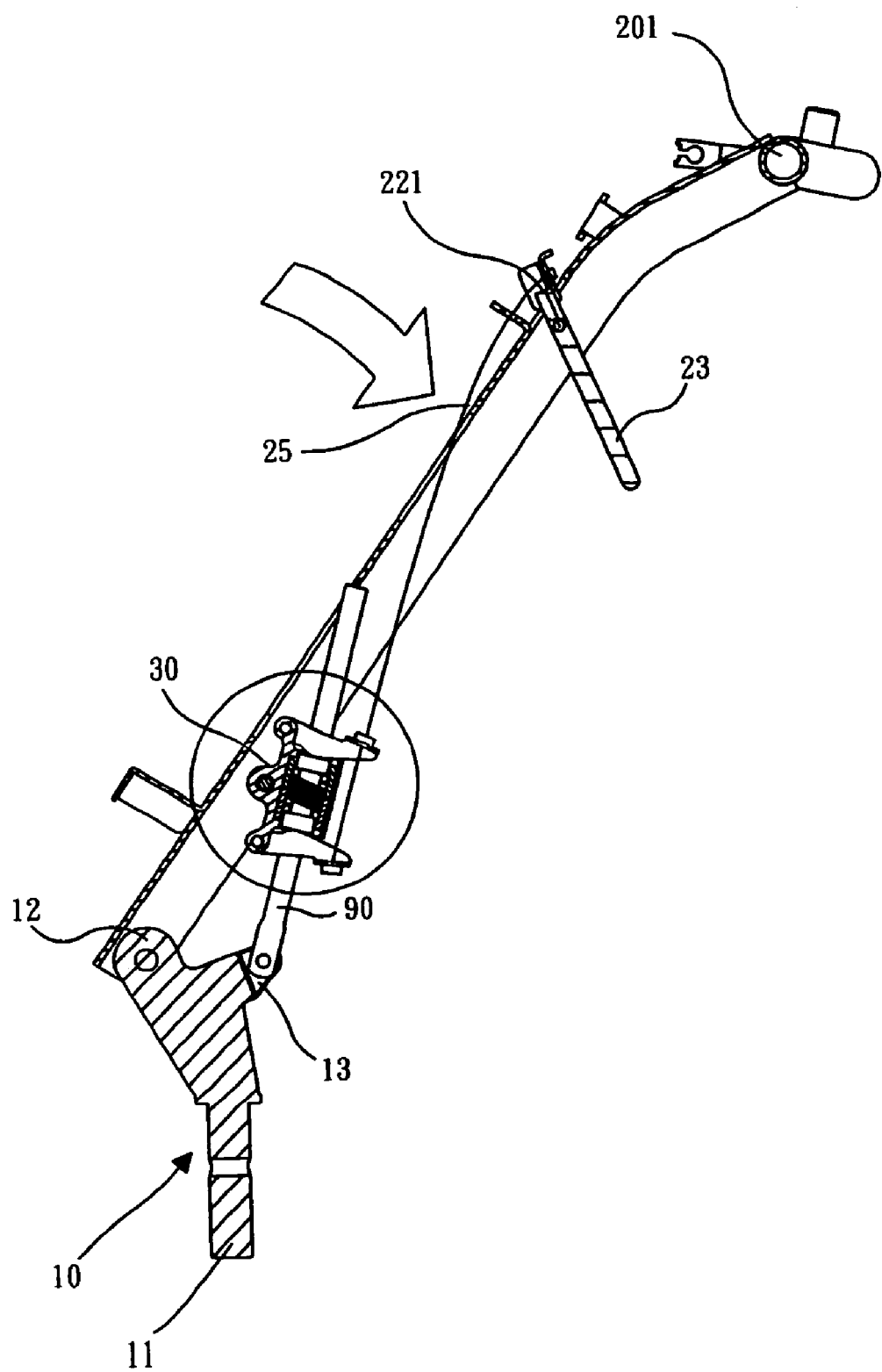
FIG. 9 is a schematic operational view of the angle adjusting device as shown in FIG. 7.
Figure 10:
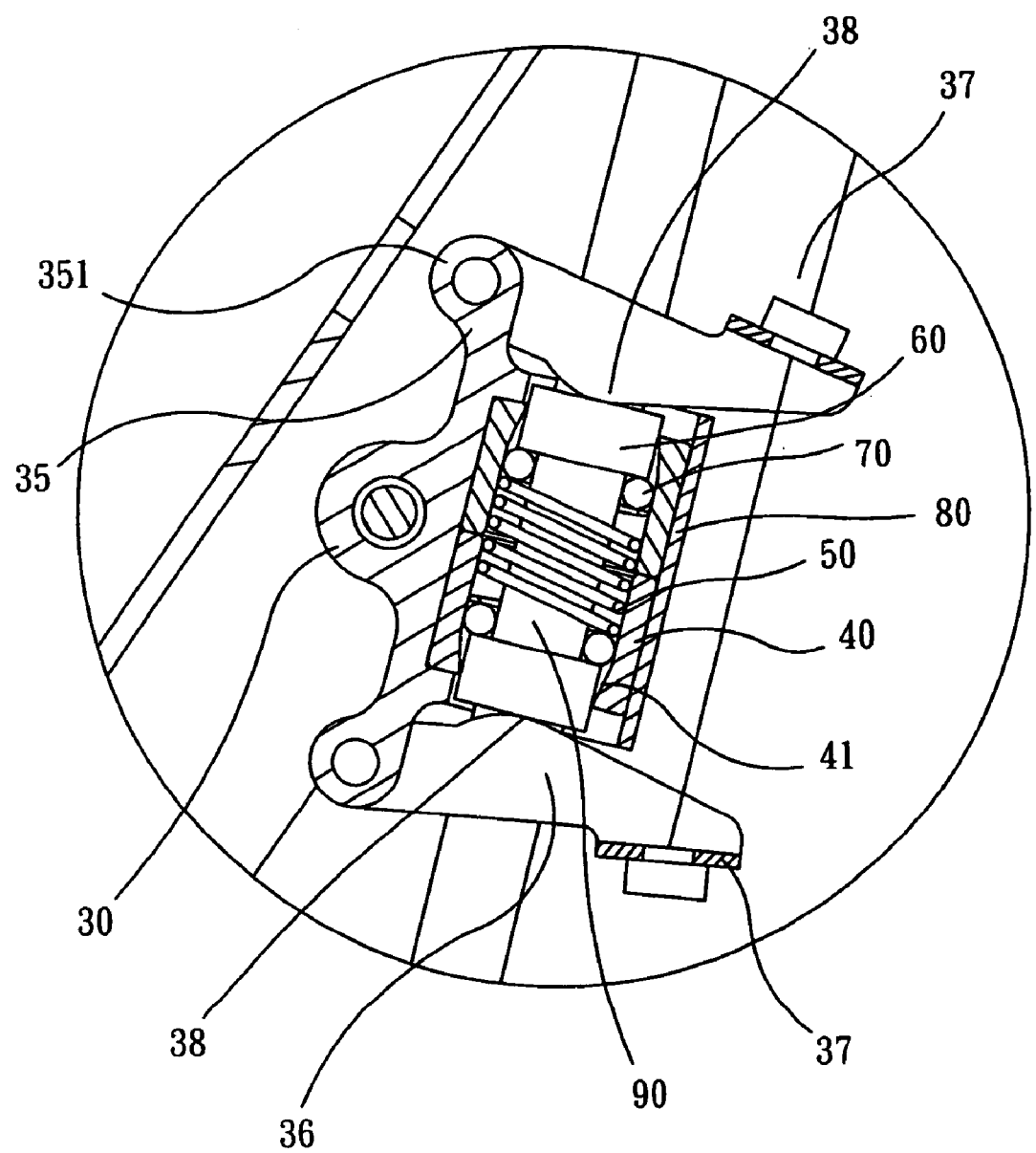
FIG. 10 is a schematic operational view of the angle adjusting device as shown in FIG. 8.
Figure 11:
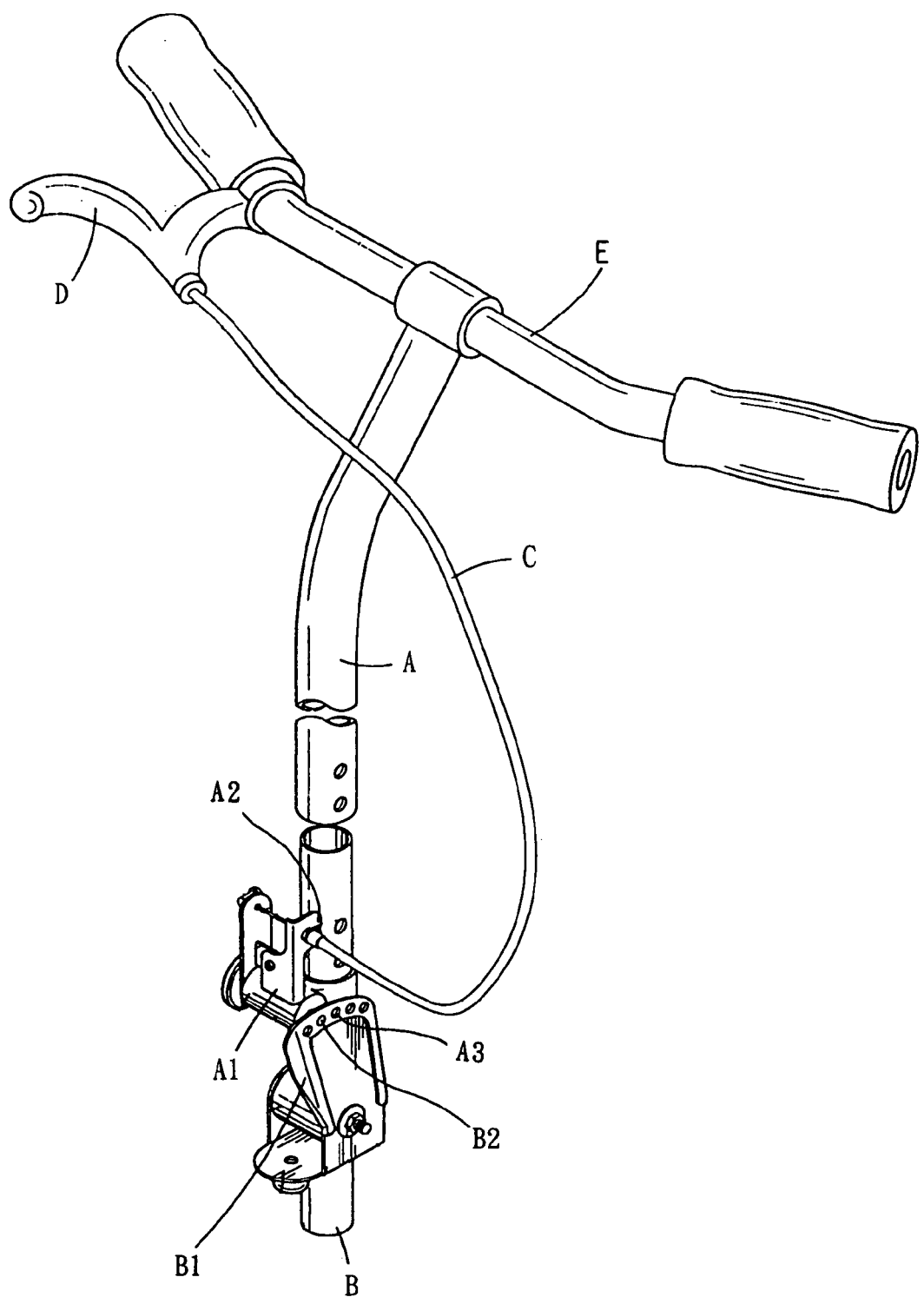
FIG. 11 is a perspective view of a conventional angle adjusting device in accordance with the prior art.

As shown in FIGS. 9 and 10, the adjusting base 30 is movable on the shaft 90 freely, so that the handlebar stem 20 is pivoted relative to the fixing seat 10, so as to adjust the included angle between the handlebar stem 20 and the fixing seat 10 arbitrarily, so that the inclined angle of the handlebar 201 mounted on the handlebar stem 20 can be adjusted easily and arbitrarily.

After the force applied on the pull handle 23 is removed, each of the urging ball units 70 is pushed by the restoring force of the compression spring 50 to move in the sockets 40 to the first position as shown in FIGS. 5 and 6 where each of the urging ball units 70 is urged by the tapered face 41 of a respective one of the sockets 40 to lock the shaft 90, so that the shaft 90 is fixed in the sockets 40 by the urging ball units 70, and the adjusting base 30 is fixed on the shaft 90.

Accordingly, the adjusting base is movable on the shaft freely, so that the handlebar stem is pivoted relative to the fixing seat, so as to adjust the included angle between the handlebar stem and the fixing seat arbitrarily, so that the inclined angle of the handlebar mounted on the handlebar stem can be adjusted easily and arbitrarily.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An angle adjusting device, comprising:
   a fixing seat having a first end formed with an upright rod and a second end having a first side formed with an elbow and a second side formed with a pivot arm;
   a handlebar stem pivotally mounted on the fixing seat and having a first end pivotally mounted on the elbow of the fixing seat;
   a pull handle pivotally mounted on the handlebar stem;
   an adjusting base pivotally mounted on the handlebar stem and having an inside formed with a chamber having two ends each formed with an opening;
   two sockets each mounted in the chamber of the adjusting base and has an inner wall having an end formed with a tapered face located adjacent to and directed toward the respective opening of the chamber of the adjusting base;
   two slides each movably mounted in the sockets and located adjacent to the tapered face of a respective one of the sockets;
   a compression spring mounted in the sockets and urged between the two slides;
   two urging ball units each movably mounted in the sockets and urged between the compression spring and a respective one of the two slides;
   a shaft pivotally mounted on the fixing seat, extended through the sockets, the compression spring and the slides, and fixed in the sockets by the urging ball units; and
   two press members each pivotally mounted on the adjusting base and each having a side formed with a pressing portion rested on a respective one of the two slides.

2. The angle adjusting device in accordance with claim 1, wherein the fixing seat is substantially Y-shaped.

3. The angle adjusting device in accordance with claim 1, wherein the pivot arm of the fixing seat is substantially U-shaped.

4. The angle adjusting device in accordance with claim 1, wherein the elbow of the fixing seat is formed with a pivot hole, the first end of the handlebar stem is formed with a first through hole aligning with the pivot hole of the elbow, and the angle adjusting device further comprises a bolt extended through the first through hole of the handlebar stem and the pivot hole of the elbow of the fixing seat, and a nut screwed onto the bolt.

5. The angle adjusting device in accordance with claim 1, wherein the handlebar stem has a mediate portion formed with a second through hole, the adjusting base has a first side formed with an elbow formed with a pivot hole aligning with the second through hole of the handlebar stem, and the angle adjusting device further comprises a bolt extended through the second through hole of the handlebar stem and the pivot hole of the elbow of the adjusting base, and a nut screwed onto the bolt.

6. The angle adjusting device in accordance with claim 5, wherein the first side of the adjusting base has two ends each formed with a protruding pivot ear formed with a pivot hole, each of the two press members has a first end formed with a pivot hole aligning with the pivot hole of the respective pivot ear of the adjusting base, and the angle adjusting device further comprises two bolts each extended through the pivot hole of a respective one of the press members and the pivot hole of the respective pivot ear of the adjusting base, and two nuts each screwed onto the respective bolt.

7. The angle adjusting device in accordance with claim 6, wherein each of the two press members has a flattened second end formed with a through hole, and the angle adjusting device further comprises a pull wire extended through the through hole of the flattened second end of each of the two press members and having a first end secured on the flattened second end of one of the two press members and a second end secured on an end of the pull handle, so that each of the two press members is pivoted on the adjusting base by pivot of the pull handle.

8. The angle adjusting device in accordance with claim 7, wherein when the pull handle is pivoted downward, the pull wire is pulled by the pull handle, so that each of the two press members is pivoted on the adjusting base by pivot of the pull handle to move the pressing portion to press each of the two slides, to press and move each of the urging ball units to detach from the tapered face of a respective one of the sockets so as to release the shaft, so that the shaft is movable in the sockets by detaching the urging ball units, and the adjusting base is movable on the shaft freely.

9. The angle adjusting device in accordance with claim 5, wherein the adjusting base has an opened second side formed with four threaded locking holes, and the angle adjusting device further comprises a cover mounted on the second side of the adjusting base and formed with four through holes aligning with the locking holes of the adjusting base, and a plurality of screws each extended through a respective one of the through holes of the cover and each screwed into a respective one of the locking holes of the adjusting base.

10. The angle adjusting device in accordance with claim 1, wherein the handlebar stem has a second end formed with a third through hole, the pull handle is formed with a pivot hole aligning with the third through hole of the handlebar stem, and the angle adjusting device further comprises a bolt extended through the third through hole of the handlebar stem and the pivot hole of the pull handle, and a nut screwed onto the bolt.

11. The angle adjusting device in accordance with claim 1, wherein the two sockets are juxtaposed to each other in the chamber of the adjusting base.

12. The angle adjusting device in accordance with claim 1, wherein the pivot arm of the fixing seat is formed with a pivot hole, the shaft has a distal end pivotally mounted on the pivot arm of the fixing seat and formed with a pivot hole aligning with the pivot hole of the pivot arm, and the angle adjusting device further comprises a bolt extended through the pivot hole of the pivot arm and the pivot hole of the shaft, and a nut screwed onto the bolt.

13. The angle adjusting device in accordance with claim 1, wherein each of the urging ball units is movable in the sockets between a first position where each of the urging ball units is urged by the tapered face of a respective one of the sockets to lock the shaft, so that the shaft is fixed in the sockets by the urging ball units, and the adjusting base is fixed on the shaft, and a second position where each of the urging ball units is detached from the tapered face of a respective one of the sockets to release the shaft, so that the shaft is movable in the sockets by detaching the urging ball units, and the adjusting base is movable on the shaft.

14. The angle adjusting device in accordance with claim 13, wherein each of the urging ball units is pushed by the elastic force of the compression spring to move in the sockets to the first position.

15. The angle adjusting device in accordance with claim 1, wherein the pressing portion of each of the two press members is arc-shaped.

16. The angle adjusting device in accordance with claim 1, wherein the fixing seat, the handlebar stem, the adjusting base and the shaft form a four-link mechanism, wherein the fixing seat functions as a fixing member, the handlebar stem functions as a swinging member, the adjusting base functions as a sliding member, and the shaft functions as a floating member.

* * * * *